(No Model.) 2 Sheets—Sheet 1.

H. BOWER & S. F. WILKINSON.
Removable Top for Wagons.

No. 243,356. Patented June 28, 1881.

Witnesses:
W. J. Dudley.
J. D. McLellan.

Inventors:
Henry Bower
Samuel F. Wilkinson
By Porter & Hutchinson, Attys

N. PETERS. Photo-Lithographer, Washington, D. C.

(No Model.) 2 Sheets—Sheet 2.
H. BOWER & S. F. WILKINSON.
Removable Top for Wagons.
No. 243,356. Patented June 28, 1881.
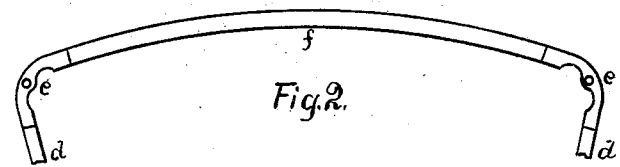
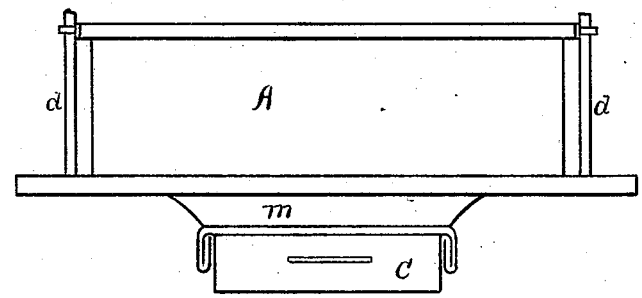
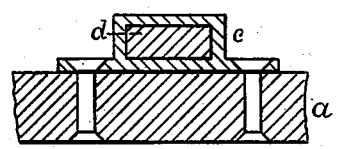
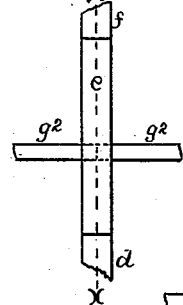
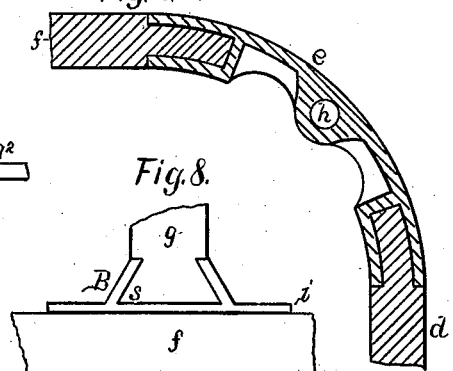
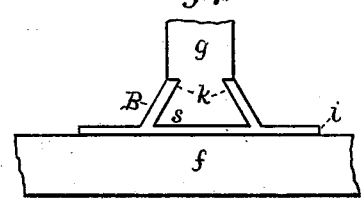
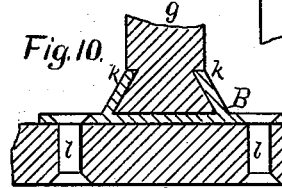
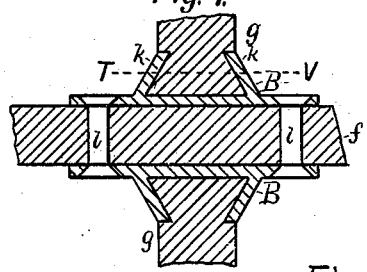
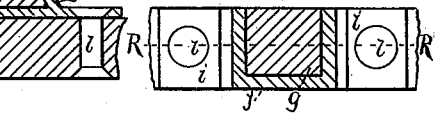
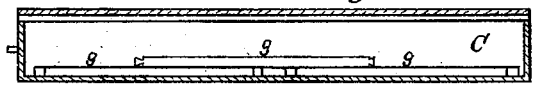
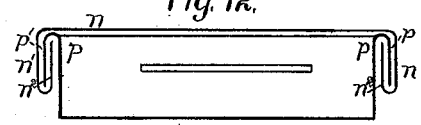
Witnesses:
W. J. Dudley.
J. D. McLeten.
Inventors:
Henry Bower
Samuel F. Wilkinson
By Porter & Hutchinson Attys
N. PETERS, Photo-Lithographer, Washington, D. C.

UNITED STATES PATENT OFFICE.

HENRY BOWER AND SAMUEL F. WILKINSON, OF CHELSEA, MASS.

REMOVABLE TOP FOR WAGONS.

SPECIFICATION forming part of Letters Patent No. 243,356, dated June 28, 1881.

Application filed March 26, 1881. (No model.)

*To all whom it may concern:*

Be it known that we, HENRY BOWER and SAMUEL F. WILKINSON, of the city of Chelsea, State of Massachusetts, have invented Improvements in Removable-Top Wagons, of which the following is a specification.

The object of our invention is to effect certain improvements in various of the details or parts which constitute our removable top, and in the receptacle wherein the same is placed beneath the wagon-body when not in use.

Figure 1:
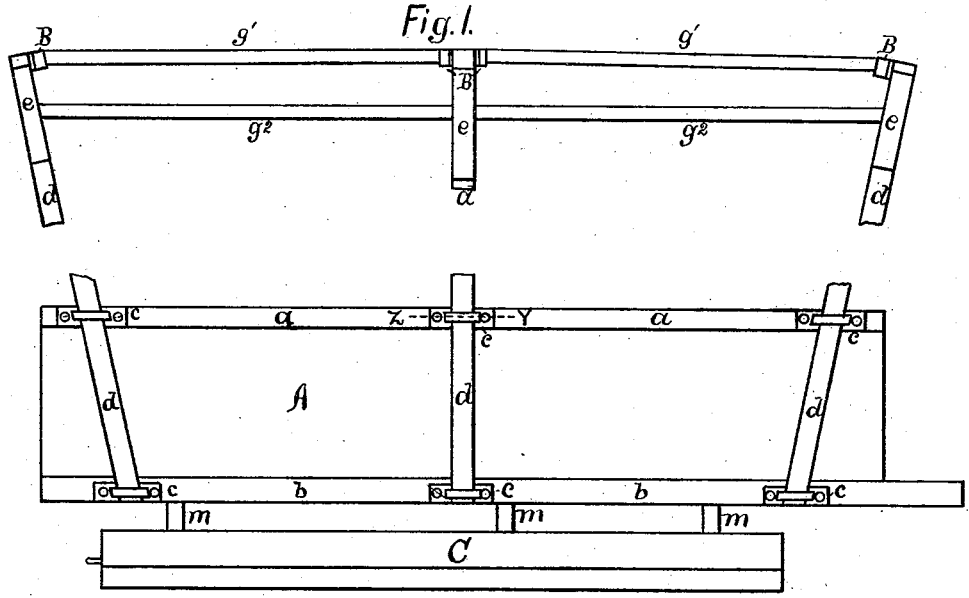
Figure 3:
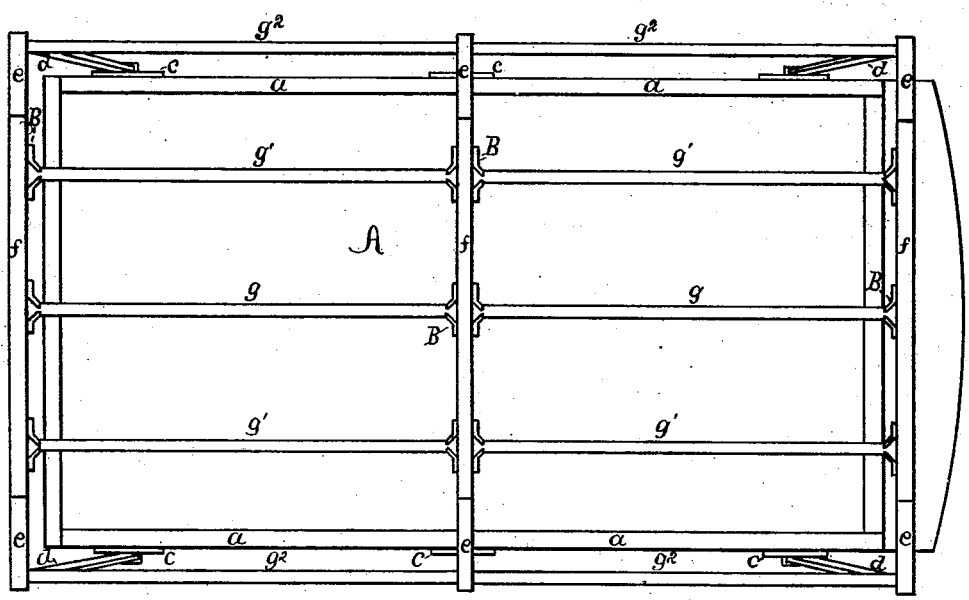

In the annexed drawings, Figure 1 is a side elevation of a wagon-body having our improvements thereto applied. Fig. 2 is an end elevation of a wagon, as shown in Fig. 1. Fig. 3 is a top or plan view of a wagon, as shown in Figs. 1 and 2. Fig. 4 is a detached horizontal section taken on line Y Z, Fig. 1, and through one of the top standards and its securing-socket. Fig. 5 is an enlarged detached elevation, showing one of the elbow-sockets as viewed in Fig. 1. Fig. 6 is a section taken on line W X, Fig. 5. Fig. 7 is a detached top or plan view, showing one of our rib-sockets secured to one of the end top bars, and with a rib seated in such socket. Fig. 8 is a view similar to Fig. 7, but showing two of said sockets secured to the center top bar, and with the ribs secured in the sockets. Fig. 9 is a horizontal section of Fig. 8, taken as on line R S, Fig. 11. Fig. 10 is a horizontal section of Fig. 7, taken as on said line R S, Fig. 11. Fig. 11 is a vertical section taken on line T V, Fig. 7. Fig. 12 is an end elevation of the receptacle for the dismounted top. Fig. 13 is a longitudinal vertical section of said receptacle, and showing some of the parts of the top therein.

In said views, A represents the body, which may be of any desired shape, size, or kind. To the top rail, $a'$, and sill $b$, on each side of said body, we secure the sockets or holders $c$, which are shown in Fig. 4, with a method of securing the same in place. In said holders $c$ we insert the standards $d$, so as to be readily removed when the top is not required in position. The upper ends of said standards $d$ are inserted in a socket in the elbow $e$, as is plainly shown in Fig. 6, while the arched top bars, $f$, at either of their ends are inserted in the socket in the upper ends of said elbows, as is plainly shown in Fig. 6. Said sockets $e$ are formed at the apex of the curve with hole or passage $h$ for the reception of the outer ribs, $g^2$, as is plainly shown in Fig. 5. Upon said bars $f$ are secured the sockets B, in which are secured the interior longitudinal ribs, $g$ and $g'$, said sockets B being formed with a back or riveting plate, $i$, for the securing-rivets $l$, a bottom plate, $j$, and the converging side plates, $k\ k$, between which are inserted the dovetail ends $s$ of the ribs $g$ and $g'$. Upon the central bar $f$ the sockets B are secured upon each side, as shown in Figs. 8 and 9, in order to receive the ends of both sets of said ribs.

By forming the metallic elbows $e$ with a hole, pocket, or seat, as at $h$, for the outer rib, $g$, said rib may be located at the proper point to support the flexible covering when it is spread over the frame; and by means of the sockets B the bars $f$ and ribs $g$ are securely united without being directly interlocked, which would weaken one or both, and they are also flush upon their upper sides, so as to present a suitable bearing for the cover.

Beneath body A we secure the box or receptacle C, by attaching the metallic cover $n$ thereof to the cross-bars $m$, said cover being formed with the depending side folds, $n'$, and the ascending fold $n^2$, as shown in Figs. 2 and 12. The body of the box is formed or provided with a depending fold or lip, $p'$, which is seated between folds $n'$ and $n^2$ of the cover, and the same so serve as the supports and slides of the box, and thereby the cover incloses the top and sides of the box, so as to render the same water-proof, and by such construction the box is strong, durable, and inexpensive.

By forming our top in the manner described and with a receptacle beneath the body the top is always with the wagon, so as to be set up at any moment when threatened rain or other causes render protection necessary, and it may be set up or taken down in a few minutes, while from its peculiarity of construction the frame when set up requires no additional fastening or connection except the cover, which should be drawn on closely, and may be secured in the usual method to body A, or, as we prefer, by short elastic straps having rings to be attached to hooks secured in said body.

We are aware that various socketed devices have been employed in connection with the wooden portion of carriage-bows, and we do not claim such devices broadly, as our invention relates to the specific devices which we employ and the combinations thereof.

We claim as our invention—

1. The elbow $e$, formed with the requisite curve and having the seats or sockets to receive the supporting-standard $d$, the roof-bar $f$, and the outer rib, $g^2$, substantially as specified.

2. The combination of top bars, $f$, dovetail sockets B, secured to said bars, and ribs $g\ g'$, formed to be seated in and secured by said sockets, substantially as specified.

3. The receptacle C, formed with top $n$, with the side folds, $n'$ and $n^2$, and the box proper, having the sides $p$ and folds $p'$, whereby said box is interlocked in and supported by said cover, substantially as specified.

HENRY BOWER.
SAMUEL F. WILKINSON.

Witnesses:
  T. W. PORTER,
  H. H. LETTENEY.